(12) United States Patent
Monjas-Llorente et al.

(10) Patent No.: US 7,266,837 B2
(45) Date of Patent: Sep. 4, 2007

(54) AUTHENTICATION, AUTHORIZATION, AND ACCOUNTING (AAA) SERVER

(75) Inventors: Miguel-Angel Monjas-Llorente, Madrid (ES); Fuencisla Garcia-Azorero, Madrid (ES); Jesus-Angel de-Gregogio-Rodriguez, Boadilla del Monte-Madrid (ES); Eva Garcia-Lizcano, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 701 days.

(21) Appl. No.: 10/712,571

(22) Filed: Nov. 13, 2003

(65) Prior Publication Data

US 2004/0105431 A1 Jun. 3, 2004

Related U.S. Application Data

(60) Provisional application No. 60/428,636, filed on Nov. 22, 2002.

(51) Int. Cl.
*H04L 9/32* (2006.01)
*H04L 9/00* (2006.01)

(52) U.S. Cl. .................... 726/2; 726/3; 726/4; 713/168

(58) Field of Classification Search ................ 726/1–4, 726/21; 380/46; 713/161, 168, 170
See application file for complete search history.

(56) References Cited

U.S. PATENT DOCUMENTS

| | | | | |
|---|---|---|---|---|
| 6,879,690 | B2 * | 4/2005 | Faccin et al. | 380/247 |
| 6,996,714 | B1 * | 2/2006 | Halasz et al. | 713/163 |
| 7,158,776 | B1 * | 1/2007 | Estes et al. | 455/411 |

* cited by examiner

*Primary Examiner*—Hosuk Song (57) ABSTRACT

A system, method, and AAA (Authentication, Authorization, and Accounting) server in a packet data network. The AAA server authenticates users, authorizes services for the users when the users access the network, and generates a session identity that comprises a unique random value that is opaque, unpredictable, and not simultaneously re-usable. The session identity includes a session reference and an identifier of the AAA server, such as a realm identifier assigned to the AAA server, that is usable to route queries containing the session identity to the appropriate AAA server. The queries may be routed to the appropriate AAA server by other AAA servers configured with routing tables that match realm identifiers to AAA servers. Alternatively, a specialized AAA server is configured with a routing table and routes the queries to the appropriate AAA server.

23 Claims, 5 Drawing Sheets

AUTHENTICATION, AUTHORIZATION, AND ACCOUNTING (AAA) SERVER

TECHNICAL FIELD

The present invention relates to communication systems. More particularly, and not by way of limitation, the present invention is directed to an Authentication, Authorization, and Accounting (AAA) server arranged to generate a master session identity that is usable to route queries containing the master session identity through a packet data network to the AAA server.

BACKGROUND ART

The Remote Access Dial-In User Service (RADIUS) is an AAA client-server protocol. RADIUS is the de facto industry standard for remote access AAA, as well as an Internet Engineering Task Force (IETF) standard. In general, RADIUS is a network process that performs authentication, authorization, and accounting actions when a user logs in on a Network Access Server (NAS) with a dial-up client, or logs out from the NAS. Typically, a RADIUS server is used by Internet Service Providers (ISPs) to perform AAA tasks. AAA tasks include verifying the identity of an entity (authentication), determining whether a requesting entity is allowed to access a resource (authorization), and collecting information on resource usage for the purpose of trend analysis, auditing, billing, or cost allocation (accounting). The RADIUS server may also be used when controlled dial-up access is needed in a particular organization. A technical specification of basic features that are supported by all RADIUS servers can be found in RFC 2865/RFC 2138 and RFC2866/RFC 2139, which are hereby incorporated by reference herein.

Existing AAA servers perform RADIUS proxy functions using static configuration tables stored in the AAA server. The static tables do not change at run-time. The AAA server typically uses the realm or the Access Point Name (APN) included in an incoming message to determine whether or not to forward the message. The realm is a part of the Network Access Identifier (NAI) that is included in the User-name attribute. According to Third Generation Partnership Project (3GPP) specifications, the APN is included as the value of the Called-Station-ID attribute. The address of the Network Access Server (NAS) is included in the NAS-IP-Address attribute.

In addition to the classic AAA functions, AAA servers may also perform session management functions such as hosting master sessions. A master session is a session created when a user is successfully authenticated by the system. The master session is terminated when the user logs off. The master session is created in a home AAA server, which hosts the data of the user to which the master session is tied. Anonymous master sessions, that is, sessions that are not bound to a user, may be created in any AAA server.

In addition to the classic RADIUS proxy functionality, there are a number of known alternative methodologies to enable a client to find the AAA server that hosts a given user. In one such methodology, the location of the AAA server is stored in an external repository such as a directory service. The directory service provides a discovery service to the client. When the client desires to access an AAA server, the client queries the directory to discover the appropriate AAA server. Afterwards, the client sends its request to the AAA server.

In another methodology enabling a client to find the AAA server that hosts a given user, all of the AAA servers that host user data (the AAA infrastructure) locate the specific AAA server when a request is received. RADIUS proxy functionality is implemented in each AAA server, and a load-balancing device randomly sends the request to any AAA server. When the AAA server receives the request, the server determines whether it is the appropriate AAA server to process the request. If not, the AAA server queries the directory service and, depending on the answer, forwards the request to the appropriate AAA server.

In another methodology enabling a client to find the AAA server that hosts a given user, the responsibility for finding the appropriate AAA server is again handled by the AAA infrastructure. A routing node contains a global directory database with the per-user locations of the AAA servers, together with a RADIUS stack and the capability of performing RADIUS proxy functions. The client sends its requests to the routing node, which looks up the appropriate AAA server in its database, and forwards the request.

The existing static routing methodologies have several shortcomings. As the number of users grows, the number of AAA servers must grow to host the users' data. When an AAA server plays the role of session manager, the existing static routing methods (based either on internal tables or external look-ups) do not support the location of the appropriate AAA instance handling the user requests for a specific session. When a client wants to access a given master session, the only parameter that is available to look it up is the master session identity (ID) because no user identity is provided. However, the master session ID is a dynamic value generated at run time, and has special features (i.e., random, unique, not reusable, and unpredictable). The routing data used by the static routing methods is based on pre-configured static tables or databases that are not updateable at run time. Thus, there is no way to determine where a master session is stored.

Similar drawbacks to those stated above may be experienced when using a Lightweight Directory Access Protocol (LDAP) interface to access a central, and likely external, repository from a first-queried AAA server that is not in charge of a given user, in order to determine the appropriate AAA server where the query should be redirected.

It would be advantageous to have an AAA server that overcomes the above-described shortcomings. The present invention provides such an AAA server.

SUMMARY OF THE INVENTION

The present invention overcomes the shortcomings of the prior art by introducing structure into the master session ID. While the master session ID remains as a random value overall, additional information indicating the situation of the master session is included within the actual master session ID.

In one aspect, the present invention is directed to an Authentication, Authorization, and Accounting (AAA) server in a packet data network. The AAA server includes means for authenticating a user; means for authorizing a service for the user when the user accesses the network; and means for generating a session identity that comprises a unique random value that is opaque, unpredictable, and not simultaneously re-usable. Additionally, the means for generating a session identity includes means for structuring the session identity to include an identifier of the AM server that is usable to route queries containing the AAA server identifier to the AAA server.

In another aspect, the present invention is directed to a system in a packet data network for routing queries to an appropriate AAA server. The system includes means for assigning a realm identifier to each of a plurality of AAA servers; means for creating a master session in a given AAA server; and means within the given AAA server for generating a master session identity that includes a session reference and the realm identifier assigned to the given AAA server. The system also includes means within the network for routing queries based on the master session identity to the given AAA server.

In yet another aspect, the present invention is directed to a method of routing queries to an appropriate AAA server in a packet data network. The method includes the steps of assigning a realm identifier to each of a plurality of AAA servers; creating a master session in a given AAA server; and generating by the given AAA server, a master session identity that includes a session reference and the realm identifier assigned to the given AAA server. Queries containing the master session identity are then routed to the given AAA server.

In yet another aspect, the present invention is directed to a method of routing queries to an appropriate AM server in a packet data network. The method includes the steps of randomly generating in each of a plurality of AM servers, a realm identifier, preferably of a fixed-length, that uniquely identifies each generating AAA server; creating a master session in a given AAA server; and generating by the given AAA server, a master session identity that includes a session reference and the realm identifier that identifies the given AAA server. Queries containing the master session identity are then routed to the given AAA server.

DETAILED DESCRIPTION OF EMBODIMENTS

When performing as a central session manager, an AAA server may authorize and account for a user based on certain master session parameters. The key parameter for identifying the master session is the master session ID. The master session ID is used as an identity token in the service layer. The master session ID is received in the user's equipment, and may be stored, modified, deleted, and so on. In order to prevent malicious use of the master session ID, certain measures need to be taken. Because of its exposure in the application level, the master session ID is made to be a one-time random value that is unique, not reusable, unpredictable, and opaque. "Unique" means that two simultaneous ongoing master sessions shall not have the same master session ID. "Not reusable" means that the number of possible values is large enough to avoid repeating master session IDs previous utilized. "Unpredictable" means that it is not possible to guess a valid ongoing master session ID based on any number of previous IDs. Finally, "opaque" means that it is not possible to extract information from the master session ID.

In the following description, the actual master session ID is referred to as the "session reference" (session_ref) and the entire token or structure provided by the AAA server (regardless of its structure or composition) is referred to as the master session ID. There are a number of embodiments of the present invention, including different measures to increase security.

Figure 1:
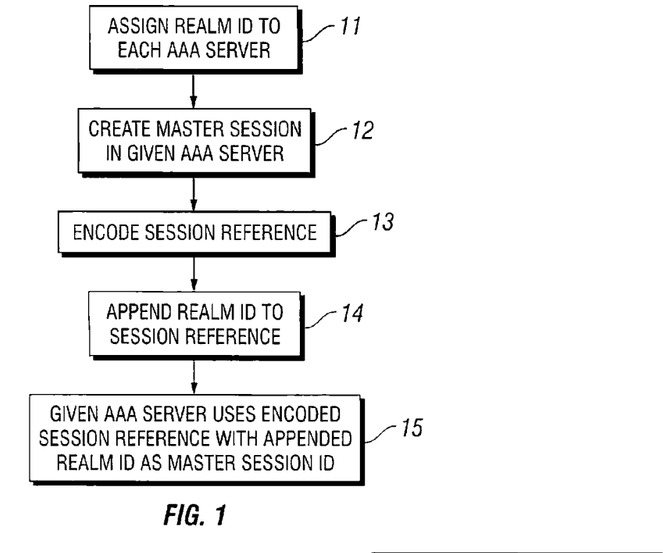
FIG. 1 is a flow chart of a first embodiment of a method of structuring a master session ID to include an identity of a given AAA server, when a corresponding master session is created.

FIG. 1 is a flow chart of a first embodiment of a method of structuring a master session ID to include an identity of a given AAA server, when a corresponding master session is created. In the first embodiment, a realm identifier is assigned to each AAA server at step 11. In step 12, a master session is created in a given AAA server. At step 13, the session reference is encoded. A number of coding techniques may be utilized, including for example, Base64, UUcode, or hexadecimal coding. At step 14, the realm ID is appended to the encoded session reference. At step 15, the given AAA server then uses the encoded session reference with the appended realm ID as the master session ID. Thus, the master session ID takes the form: encodedsession_ref."@".realm_id. As an example, a master session ID may thus take the form:

[Base64(session_ref)]."@".realm$_{13}$ id where "." indicates concatenation. Taking, for example, 2AFD4590BB0B1C21 as the session reference and aaa01 as the realm, the resulting master session ID is:

2AFD4590BB0B1C21@aaa01

Figure 2:
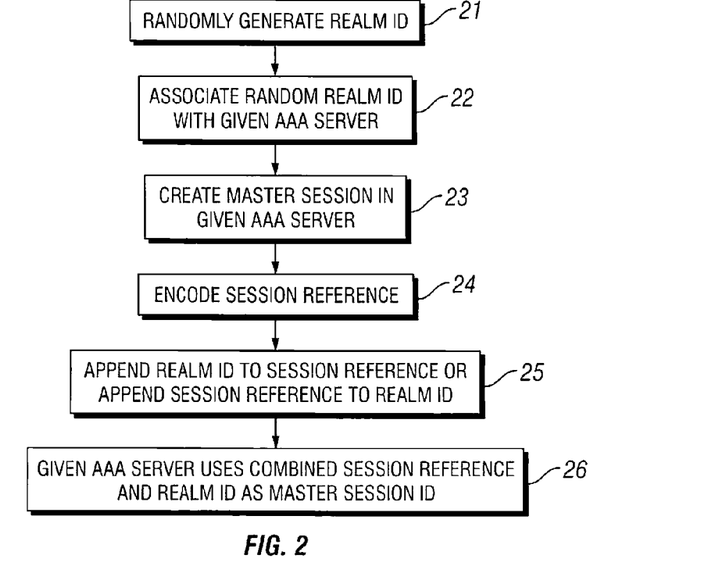
FIG. 2 is a flow chart of a second embodiment of a method of structuring a master session ID to include an identity of a given AAA server, when a corresponding master session is created.

FIG. 2 is a flow chart of a second embodiment of a method of structuring a master session ID to include an identity of a given AAA server, when a corresponding master session is created. In the second embodiment, a realm ID, preferably of a fixed-length, is randomly generated at step 21, and at step 22, the realm ID is associated with a given AAA server. At step 23, a master session is created in a given AAA server. At step 24, the session reference is encoded. At step 25, the realm ID is then appended to the session reference, or alternatively, the realm ID is placed at the beginning of the session ID (i.e., the session reference is appended to the realm ID). At step 26, the given AAA server then uses the combined session reference with the realm ID as the master session ID. Thus, a master session ID may alternatively take the form of:

encodedsession_ref.realm_id or realm_id.encodedsession_ref

Using the same session reference as the first embodiment, and using 2D54GA as a randomly generated realm ID, the resulting master session ID is:

2AFD4590BB0B1C212D54GA or
    2D54GA2AFD4590BB0B1C21

Figure 3:
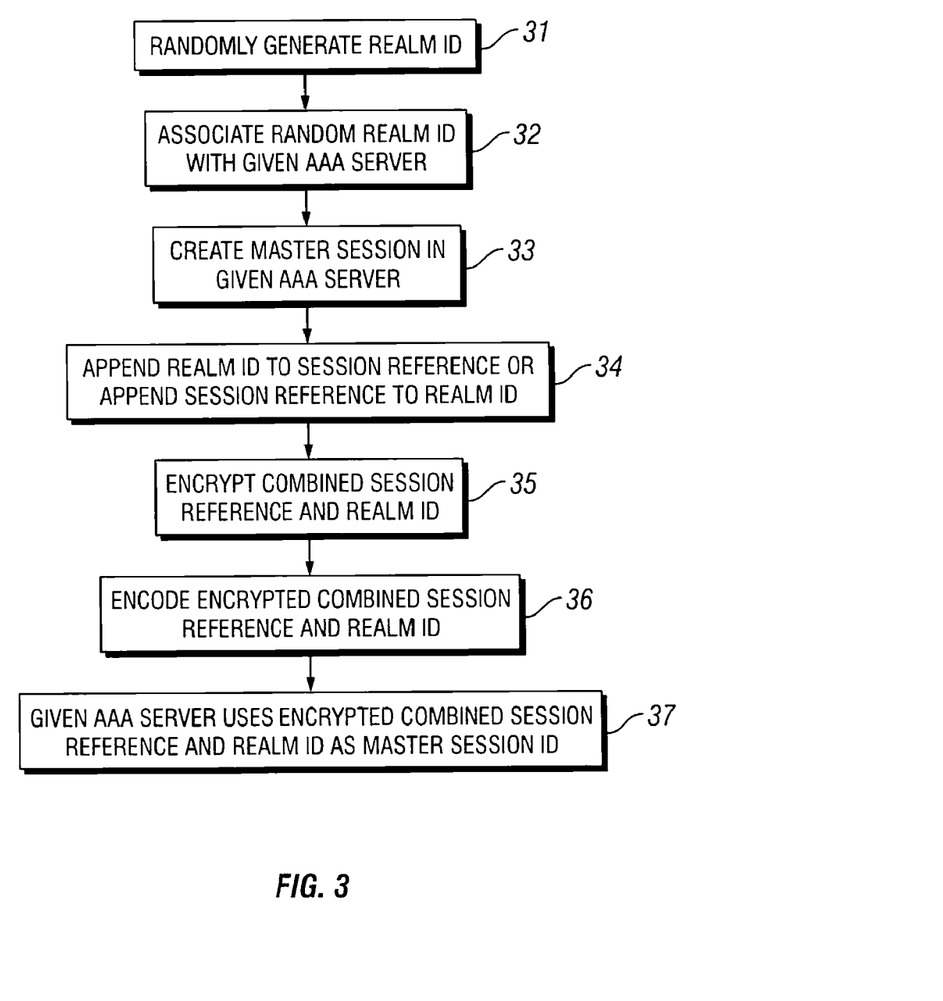
FIG. 3 is a flow chart of a third embodiment of a method of structuring a master session ID to include an identity of a given AAA server, when a corresponding master session is created.

FIG. 3 is a flow chart of a third embodiment of a method of structuring a master session ID to include an identity of a given AAA server, when a corresponding master session is created. In the third embodiment, the master session ID is encrypted in order to conceal the semantics of the master session ID. At step 31, a fixed-length realm ID is randomly generated, and at step 32, the realm ID is associated with a given AAA server. At step 33, a master session is created in a given AAA server. At step 34, the realm ID is then appended to the session reference, or alternatively, the realm ID is placed at the beginning of the session ID (i.e., the session reference is appended to the realm ID). At step 35, the combined session reference and realm ID is encrypted. Since the creator of the master session ID is the same entity as the one that looks up the specific master session, symmetric encryption may be utilized. All of the AAA servers share the same symmetric key. At step 36, the encrypted combined session reference and realm ID is encoded. At step 37, the given AAA server then uses the encrypted combined session reference with the realm ID as the master session ID. Thus, the master session ID takes the form: encoded(encrypt (session_ref.realm_id)). As an example, a master session ID may thus take the form:

Base64(encrypt(session_ref.realm_id))

An advantage of this embodiment is that it prevents Denial of Service (DoS) attacks against specific AAA servers because whenever an AAA server receives a request, the server checks to ensure that the master session ID is not fake before forwarding the request. This advantage is gained at the expense of requiring more processing power in the AAA server to perform additional encryption and decryption operations required to create the identifier and look up the master session.

Figure 4:
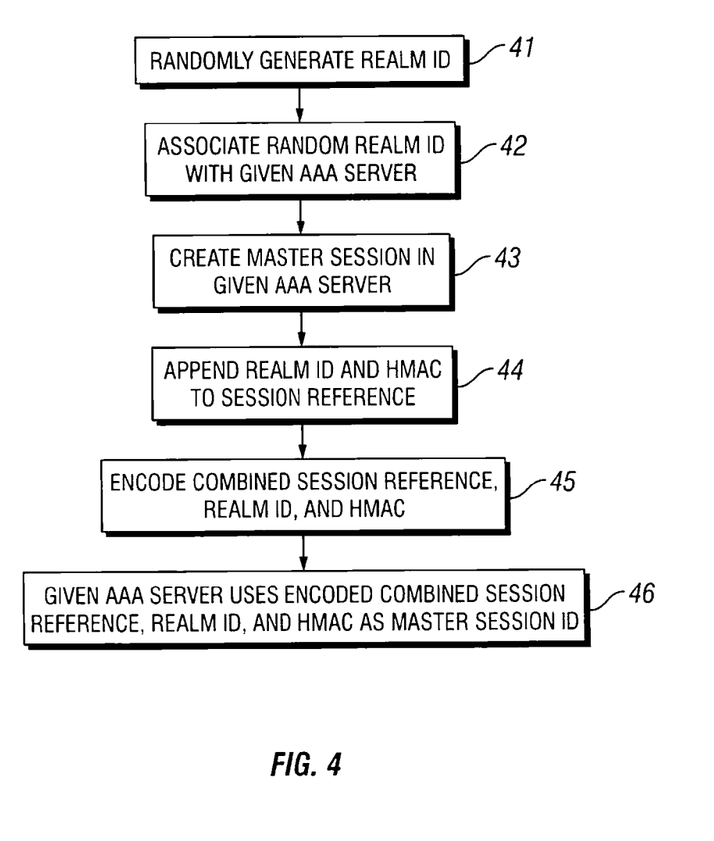
FIG. 4 is a flow chart of a fourth embodiment of a method of structuring a master session ID to include an identity of a given AAA server, when a corresponding master session is created.

FIG. 4 is a flow chart of a fourth embodiment of a method of structuring a master session ID to include an identity of a given AAA server, when a corresponding master session is created. In the fourth embodiment, rather than encryption, a Keyed-Hasing Message Authentication Code (HMAC) is used at both ends of the communication to guarantee that a received master session ID is legitimate and to prevent DoS attacks. HMAC is a mechanism for message authentication using cryptographic hash functions. HMAC can be used with any cryptographic hash function such as MD5, SHA-1, etc. in combination with a secret shared key. HMAC verification is much faster than encryption/decryption operations and, although based in a secret shared by both parties, it may re-use the common mechanism used by RADIUS servers and clients since both RADIUS servers and clients need to own a shared secret. Use of HMAC verification prevents attacks based on guessing the master session ID.

At step 41, a fixed-length realm ID is randomly generated, and at step 42, the realm ID is associated with a given AAA server. At step 43, a master session is created in a given AAA server. At step 44, the realm ID and the HMAC are then appended to the session reference. At step 45, the combined session reference, realm ID, and HMAC is encoded. At step 46, the given AAA server then uses the encoded combined session reference, realm ID, and HMAC as the master session ID. Thus, the master session ID takes the form: encoded(session_ref.realm_id.HMAC)). As an example, a master session ID may thus take the form:

Base64(session_ref.realm_id.HMAC)

Figure 5:
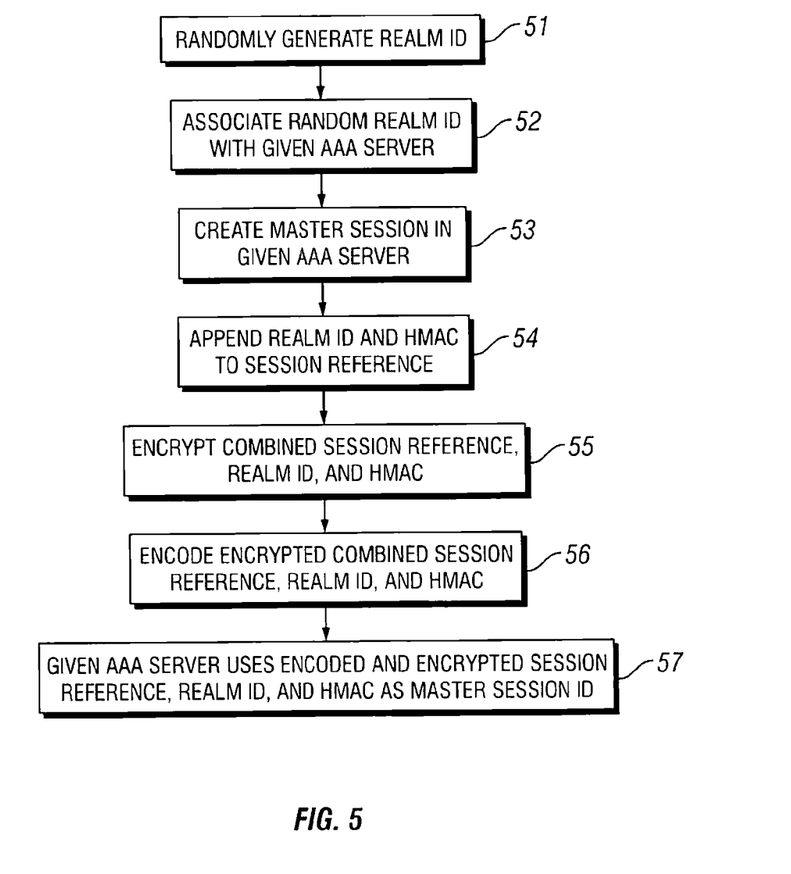
FIG. 5 is a flow chart of a fifth embodiment of a method of structuring a master session ID to include an identity of a given AAA server, when a corresponding master session is created.

FIG. 5 is a flow chart of a fifth embodiment of a method of structuring a master session ID to include an identity of a given AAA server, when a corresponding master session is created. In the fifth embodiment, both encryption and HMAC are utilized. Encryption provides hiding of the structure while the HMAC is useful as a counter-tampering measure. At step 51, a fixed-length realm ID is randomly generated, and at step 52, the realm ID is associated with a given AAA server. At step 53, a master session is created in a given AAA server. At step 54, the realm ID and the HMAC are then appended to the session reference. At step 55, the combined session reference, realm ID, and HMAC is encrypted. At step 56, the encrypted combined session reference, realm ID, and HMAC is encoded. At step 57, the given AAA server then uses the encrypted and encoded combined session reference, realm ID, and HMAC as the master session ID. Thus, the master session ID takes the form: encoded(encrypt(session_ref.realm_id.HMAC)). As an example, a master session ID may thus take the form:

Base64(encrypt(session_ref.realm_id.HMAC))

Figure 6:
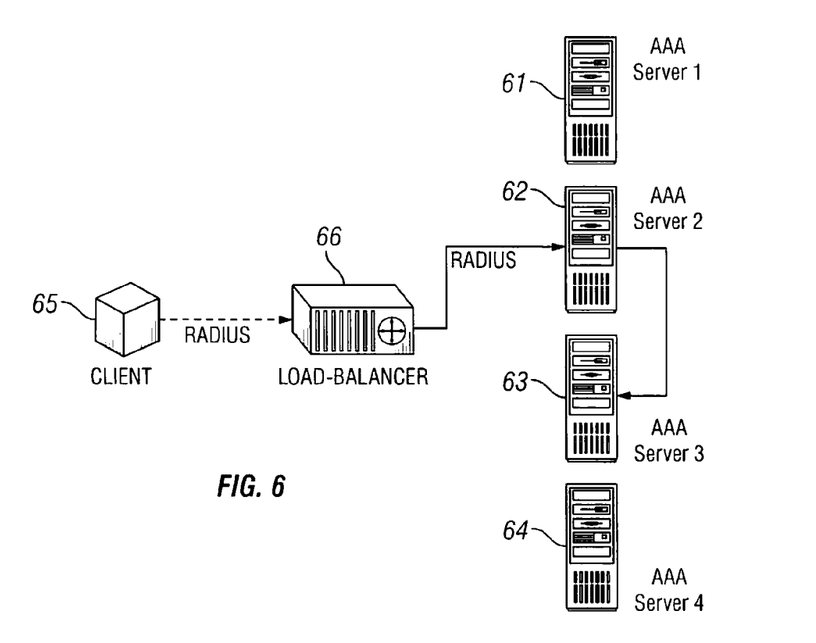
FIG. 6 is a simplified diagram illustrating a first network configuration in which a plurality of AAA servers are configured to perform both proxy functions and home functions.

FIG. 6 is a simplified diagram illustrating a first network configuration in which each of the AAA servers 61-64 is configured to perform both proxy functions and home functions. Each AAA server is configured with the routing tables needed to route a session-ID-based request to the appropriate AAA server instance. Thus, when a RADIUS request from a client 65 is randomly routed by a load balancer 66 to an AAA server such as AAA server 62, the AAA server 62 determines that AAA server 63 is the appropriate AAA server, and routes the request to AAA server 63.

Figure 7:
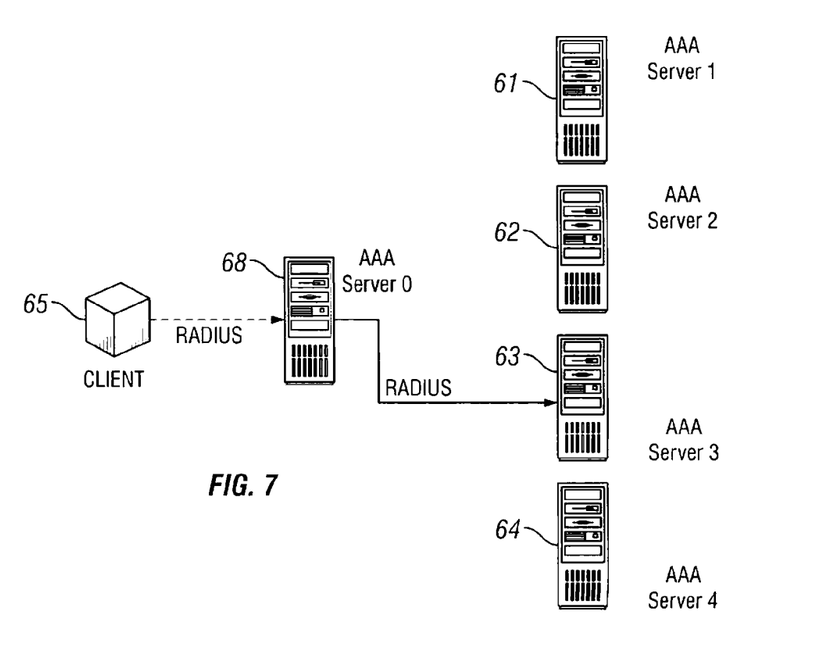
FIG. 7 is a simplified diagram illustrating a second network configuration in which a specialized AAA server performs only proxy functions and serves as the AAA infrastructure front-end.

FIG. 7 is a simplified diagram illustrating a second network configuration in which a specialized AAA server 68 performs only proxy functions and serves as the AAA infrastructure front-end. Only the specialized AAA server is configured with the routing tables needed to route a session-ID-based request to the appropriate AAA server instance. Thus, when a request from the client 65 is received by the specialized AAA server 68, the specialized AAA server determines that AAA server 63 is the appropriate AAA server, and routes the request to AAA server 63.

Additional protection measures may also be utilized with the present invention to ensure correct operation in the face of malicious attacks. As noted above in the third embodiment, encryption of the master session ID may prevent attacks based on knowledge of the structure of the master session ID. However, this embodiment imposes a requirement that the encryption/decryption key be distributed to all entities involved in the encryption and decryption processes. To reduce the impact of this requirement, the master session ID may be encrypted only when it is released to the user (i.e., between the browser and the border gateway). The master session ID is then carried on in plain text between the border gateway and the AAA server. Alternatively, distribution of the encryption/ decryption key can be avoided by having the AAA server decrypt the master session ID using an Application Programming Instruction (API).

Another possible type of attack is based on eavesdropping and sending a reply once the master session ID is determined. Eavesdropping/reply attacks cannot be prevented by encryption. Only partial solutions can be used. For example, the master session ID can be tied to the IP address of the user equipment, as long as this solution is used in a core network scenario in which the IP address of the user is trusted and available in the AAA server. For instance, a Cyclical Redundancy Check (CRC) value or digest (using a hash function) may be included in the master session ID structure. The AAA server adds that footprint to the master session ID, while the border gateway checks the IP address received in the request from the client. Alternatively, the IP address may be used to compute the HMAC of the master session ID.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. An Authentication, Authorization, and Accounting (AAA) server in a packet data network comprising:
    means for authenticating a user;
    means for authorizing a service for the user when the user accesses the network; and
    means for generating a session identity, said session identity comprising a unique random value that is opaque, unpredictable, and not simultaneously re-usable, wherein the means for generating a session identity includes means for structuring the session identity to include an identifier of the AAA server, said AAA server identifier being usable to route queries containing the AAA server identifier to the AAA server.

2. The AAA server of claim 1, further comprising:
    means for extracting from a session identity received in a query, an AAA server identifier for another AAA server in the packet data network; and
    means for routing the query to the other AAA server based on the extracted AAA server identifier.

3. The AAA server of claim 1, wherein the means for generating a session identity includes means for structuring the session identity to include a session reference (session_ref) and a realm identifier (realm_id).

4. The AAA server of claim 3, wherein the means for generating a session identity includes means for encoding the session reference such that the form of the session identity is: encoded session_ref."@".realm_id, where "." indicates concatenation.

5. The AAA server of claim 3, wherein the means for generating a session identity includes:
    means for encoding the session reference; and
    means for appending the realm identifier to the encoded session reference such that the form of the session identity is: encoded session_ref.realm_id.

6. The AAA server of claim 3, wherein the means for generating a session identity includes:
    means for encoding the session reference: and
    means for appending the encoded session reference to the realm identifier such that the form of the session identity is: realm_id.encoded session_ref.

7. The AAA server of claim 3, wherein the means for generating a session identity includes:
    means for encrypting the session reference and the realm identifier; and
    means for encoding the encrypted session reference and realm identifier such that the form of the session identity is: encoded(encrypt(session_ref.realm_id)).

8. The AAA server of claim 3, wherein the means for generating a session identity includes means for concatenating the session reference with the realm identifier and a Keyed-Hasing Message Authentication Code (HMAC).

9. The AAA server of claim 8, wherein the means for generating a session identity also includes means for encoding the concatenated session reference, realm identifier, and HMAC such that the form of the session identity is: encoded (session_ref.realm_id.HMAC).

10. The AAA server of claim 9, wherein the means for generating a session identity also includes means for encrypting the concatenated session reference, realm identifier, and HMAC prior to encoding such that the form of the session identity is: encoded(encrypt(session_ref.realm_id.HMAC)).

11. In a packet data network having a plurality of Authentication, Authorization, and Accounting (AAA) servers, a system for routing queries to an appropriate AAA server, said system comprising:
    means for assigning a realm identifier to each of the plurality of AAA servers;
    means for creating a master session in a given AAA server;
    means within the given AAA server for generating a master session identity that includes a session reference and the realm identifier assigned to the given AAA server; and
    means within the network for routing queries based on the master session identity to the given AAA server.

12. The system of claim 11, wherein the means within the network for routing queries includes a load balancer that receives queries based on the master session identity and sends the queries to a randomly selected AAA server, wherein the selected AAA server includes:
    means for determining whether a received query is for the selected server;
    a routing table for identifying the appropriate AAA server based on the realm identifier in the master session identity; and
    means for routing the queries to the identified appropriate AAA server, upon determining that the received query is not for the selected server.

13. The system of claim 11, wherein the means within the network for routing queries includes a specialized AAA server that receives queries based on the master session identity and routes the queries to the appropriate AAA server, said specialized AAA server including:
    a routing table for identifying the appropriate AAA server based on the realm identifier in the master session identity; and
    means for routing the queries to the identified appropriate AAA server.

14. The system of claim 11, wherein the means for generating a master session identity also includes encoding means and encrypting means for encoding and encrypting the master session identity.

15. The system of claim 11, wherein the means for generating a master session identity also includes encoding means for encoding the master session identity, and the system further comprises a border gateway that encrypts the encoded master session identity when the border gateway sends the master session identity to a user's browser.

16. In a packet data network having a plurality of Authentication, Authorization, and Accounting (AAA) servers, a method of routing queries to an appropriate AAA server, said method comprising the steps of:

assigning a realm identifier to each of the plurality of AAA servers;

creating a master session in a given AAA server;

generating by the given AAA server, a master session identity that includes a session reference and the realm identifier assigned to the given AAA server: and routing queries containing the master session identity to the given AAA server.

17. The method of claim 16, wherein the step of routing queries includes the steps of:

configuring each of the AAA servers with routing tables for identifying the appropriate AAA server based on the realm identifier in the master session identity;

receiving a query based on the master session identity in a load balancer;

sending the query from the load balancer to a randomly selected AAA server;

determining in the selected AAA server, whether a received query is for the selected server;

if the query is not for the selected AAA server, identifying the appropriate AAA server utilizing the selected AAA server's routing table; and routing the query from the selected AAA server to the identified appropriate AAA server.

18. The method of claim 17, wherein the step of determining in the selected AAA server, whether a received query is for the selected server includes the steps of:

extracting a realm identifier from the master session identity received in the query: and determining whether the extracted realm identifier matches the realm identifier assigned to the selected AAA server.

19. The method of claim 16, wherein the step of routing queries includes the steps of:

receiving a query based on the master session identity in a specialized AAA server configured with a routing table that matches realm identifiers with AAA servers;

identifying by the specialized AAA server, the appropriate AAA server based on the realm identifier in the master session identity; and routing the query to the identified appropriate AAA server.

20. The method of claim 16, wherein the step of generating a master session identity includes encoding and encrypting the master session identity.

21. The method of claim 16, wherein the step of generating a master session identity includes encoding the master session identity, and the method further comprises encrypting the encoded master session identity in a border gateway when the border gateway sends the master session identity to a user's browser.

22. The method of claim 16, wherein the step of generating a master session identity includes encoding the master session identity and adding a cyclical redundancy check (CRC) value, and the method further comprises verifying in a border gateway, an Internet Protocol (IP) address of a client sending a query to the given AAA server.

23. In a packet data network having a plurality of Authentication, Authorization, and Accounting (AAA) servers, a method of routing queries to an appropriate AAA server, said method comprising the steps of:

randomly generating in each of the plurality of AAA servers, a fixed-length realm identifier that uniquely identifies each generating AAA server;

creating a master session in a given AAA server;

generating by the given AAA server, a master session identity that includes a session reference and the realm identifier that identifies the given AAA server; and routing queries containing the master session identity through the network to the given AAA server.

* * * * *

UNITED STATES PATENT AND TRADEMARK OFFICE
CERTIFICATE OF CORRECTION

PATENT NO. : 7,266,837 B2 Page 1 of 1
APPLICATION NO. : 10/712571
DATED : September 4, 2007
INVENTOR(S) : Monjas-Llorente et al.

It is certified that error appears in the above-identified patent and that said Letters Patent is hereby corrected as shown below:

In Column 2, Line 65, delete "AM" and insert -- AAA --, therefor.

In Column 3, Line 25, delete "AM" and insert -- AAA --, therefor.

In Column 3, Line 27, delete "AM" and insert -- AAA --, therefor.

In Column 4, Line 47, delete "[Base64(session_ref)]."@".realm$_{13}$ id" and insert -- [Base64(session_ref)]."@".realm_id --, therefor.

In Column 7, Line 57, in Claim 6, delete "reference:" and insert -- reference; --, therefor.

In Column 9, Line 6, in Claim 16, delete "server:" and insert -- server; --, therefor.

In Column 9, Line 29, in Claim 18, delete "query:" and insert -- query; --, therefor.

Signed and Sealed this

Thirteenth Day of May, 2008

JON W. DUDAS
*Director of the United States Patent and Trademark Office*